G. A. BRYAN.
WATER LEVEL INDICATOR.
APPLICATION FILED JUNE 19, 1920.
1,406,926. Patented Feb. 14, 1922.
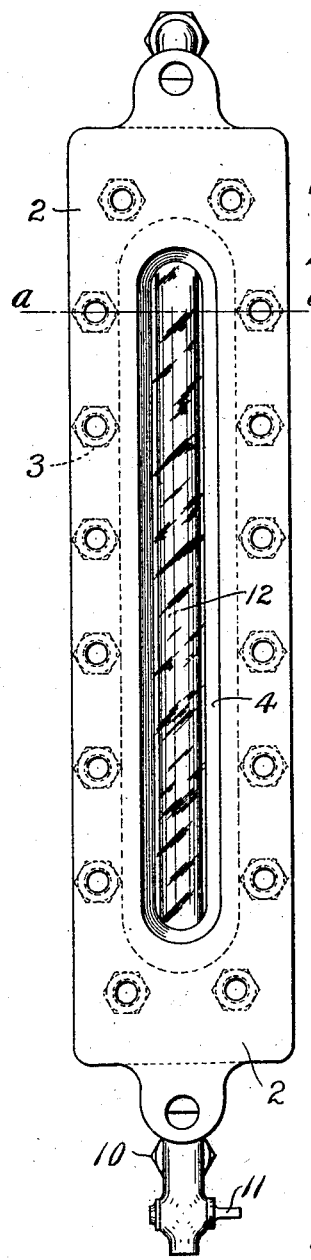
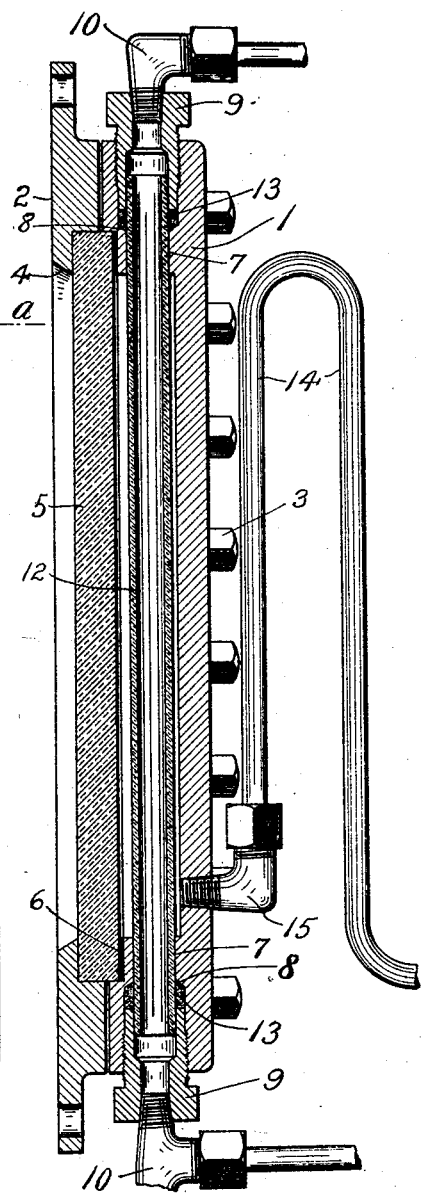
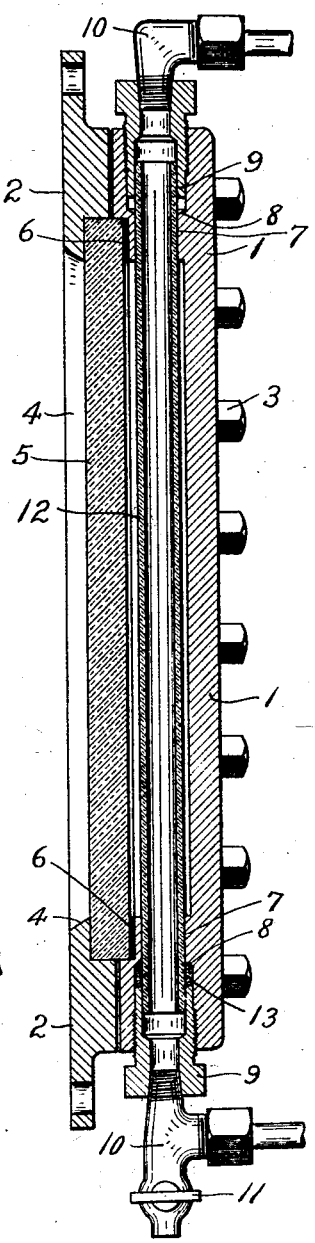
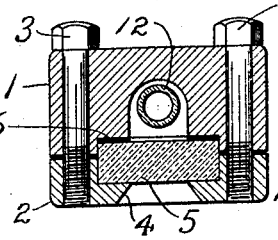
INVENTOR
George A. Bryan
BY
Rosenbaum, Stockbridge & Borsh
ATTORNEYS.

UNITED STATES PATENT OFFICE.

GEORGE ALFRED BRYAN, OF PERU, INDIANA.

WATER-LEVEL INDICATOR.

1,406,926. Specification of Letters Patent. Patented Feb. 14, 1922.

Application filed June 19, 1920. Serial No. 390,067.

*To all whom it may concern:*

Be it known that I, GEORGE ALFRED BRYAN, a citizen of the United States, residing at Peru, in the county of Miami and State of Indiana, have invented certain new and useful Improvements in Water-Level Indicators, of which the following is a full, clear, and exact description.

This invention relates to water level indicators of the type employed in connection with steam generators. An object is to provide an indicator in which damage to adjacent objects and injury to attendants due to the breakage of the water tube of the indicator are prevented. Another object is to provide an indicator in which the water or indicator tube is protected from accidental injury, or from cracking by contact with cold drafts of air. Another object is to provide an indicator of the above type in which the vision is good, which is simple and durable in construction, and inexpensive to manufacture, and which requires a minimum of attention after installation. Other objects and advantages will be apparent from the following description, and the novel features of my invention will be particularly pointed out in claims.

The invention comprehends the enclosure of the usual transparent water tube within a casing having a strong glass window in a wall through which the level of the water in the water tube may be observed, the casing being completely filled with a liquid, preferably water, either clear or colored, with provision for keeping the casing completely filled with the liquid and under the same pressure as that within the water tube.

In the drawings:

Fig. 1 is a front elevation of an indicator in which my invention has been embodied;

Fig. 2 is a vertical section of the same;

Fig. 3 is a vertical section of the same, but indicating a slight modification, and Fig. 4 is a horizontal section substantially on the line *a—a* of Fig. 1.

Referring to the drawings, the main casing 1 is provided with a side wall 2 removably secured thereto by screws 3 and having a window opening 4. A transparent window glass 5 is secured between the cover 2 and the casing 1 to close the window opening, the casing being made water-tight by gaskets 6 between the edges of the window glass and the casing. The upper and lower ends of the casing have aligned apertures 7 therethrough, the outer section of each aperture being larger than the inner section and forming a shoulder 8 between them. Connection terminals or fittings 9 are threaded into the larger outer sections of the apertures of the casing and have suitable connections 10 leading to the generator in the usual manner. The lower connection 10 has a drain cock 11 by means of which the indicator can be blown for cleaning the indicating tube of sediment, etc. A transparent indicating tube 12 extends through the casing with its ends passing through the small sections of the aligned apertures and projecting into the ends of the connection terminals or fittings 9. In the embodiment illustrated in Fig. 2 I provide packing 13 surrounding the ends of the glass in the apertures and between the shoulders 8 and the inner ends of the fittings 9, to seal the generator connections to the tubes and also prevent leakage into the casing. A U-shaped pipe 14 is connected to the lower part of the casing by a fitting 15 connected to one arm of the U, and the other arm of the U is adapted for connection to the generator. The base of the U preferably extends at least as high as the top of the chamber within the casing. The chamber within the casing is filled with a suitable liquid such as water and by means of the pipe 14 the pressure within and without the indicating tube is equalized. The pressure also maintains the casing filled.

In the embodiment illustrated in Fig. 3 I have omitted the pipe 14 as a connection to the generator and in place thereof I dispense with the packing 13 at the upper end of the tube 12 so that there will be sufficient leakage past the side of the tube into the casing at this end to equalize the pressure upon the inside and outside of the tube. There will also be sufficient condensation to maintain the casing filled with water.

The water within the casing may be clear or slightly colored in order to have the column of water readily visible from the front window. The casing surrounding the indicating tube protects the latter from injury by accidental contact of an object and the tube, and from cold air which is likely to crack it, and keeps the heat and steam from direct contact with the flat glass to eliminate contraction and expansion of the same and protect the gaskets 6 from destruction. If the indicating tube should for any reason become broken, the casing protects surrounding instruments, machinery, or the attendants from the live steam that would issue therefrom.

When the indicator is used with generators where condensing is not employed, I prefer to fill the casing with clean pure water and keep it so by using the pipe 14. When condensing is employed, the pipe 14 and upper packing 13 may, if desired be dispensed with and the casing filled with water and maintained filled from the upper generator connection without trouble from sediment dropping into the outside cavity and obstructing the vision. I have found that the colored water in the outer casing aids in determining the height of the water column in the inner tube.

It is obvious that various changes in the construction herein described and illustrated may be made within the principle and scope of my invention.

I claim:

1. A water level indicator for steam generators, comprising a transparent indicating tube, means for connecting the ends of the tube to a generator above and below the normal water line, and a casing surrounding the tube and filled with a liquid, said casing having a transparent portion enabling observation of the level within the indicating tube.

2. A water level indicator for steam generators comprising a closed casing filled with a suitable liquid and having a transparent window in a wall thereof, a transparent tube extending between the end walls of said casing, and means for connecting the ends of the tube to a generator.

3. A water level indicator for steam generators comprising a closed casing filled with a suitable slightly colored liquid and having a transparent window in one wall thereof, a transparent tube extending between the end walls of said casing, and means for connecting the ends of the tube to a generator.

4. A water level indicator for steam generators comprising a closed casing having a transparent window in one wall thereof, a transparent tube extending between the end walls of said casing, and means for connecting the interior of said casing and said tube to a generator.

5. A water level indicator for steam generators comprising a closed casing filled with a suitable liquid and having a transparent window in one wall thereof, a transparent tube extending between the end walls of said casing, and means for connecting the interior of said casing and said tube to a generator.

6. A water level indicator for steam generators comprising a closed casing filled with a suitable slightly colored liquid and having a transparent window in one wall thereof, a transparent tube extending between the end walls of said casing, and means for connecting the interior of said casing and said tube to a generator.

7. A water level indicator for steam generators comprising a closed casing having a transparent window in one side wall thereof, a transparent tube extending between the end walls of said casing and visible through said window, means for connecting the ends of the tubes to a generator, and means including a single conduit for connecting the interior of said casing to said generator to equalize the pressure on the inside and outside of the transparent tube.

8. A water level indicator for steam generators comprising a closed casing having a transparent window in one side wall thereof, a transparent tube extending between the end walls of said casing and visible through said window, means for connecting the ends of the tubes to a generator, and a pipe connected to said casing, extending to a height equal to that of the chamber within the casing, and then connectible to said generator.

9. In a water level indicator, a casing having a transparent window in one side wall, aligned apertures in the opposite end walls, the outer ends of each of the apertures being enlarged, a transparent tube extending through said casing with its ends closely passing through the narrow portion of each aperture and into the enlarged portions, boiler connection terminals into which the ends of the tube project, threaded into the enlarged sections of the apertures, and packing at the inner end of one of the terminals and surrounding the tube.

10. A water level indicator for steam generators comprising a transparent indicating tube, means for connecting the ends of the tube to a generator, above and below the normal water line, a casing surrounding the tube and filled with a liquid, said casing having a transparent portion enabling observation of the level within the indicating tube, a connection between the casing and the boiler for maintaining the casing filled with the liquid and for equalizing the pressure within and without the indicating tube.

11. A water level indicator for steam generators comprising an indicating tube, means for connecting the tube to a generator, a jacket filled with a liquid completely surrounding said tube, and having generator connection to maintain the jacket completely filled with a liquid and equalize the pressure upon the inside and outside of the indicating tube.

12. A water level indicator for steam generators, comprising an indicating tube, means for connecting the tube to a generator, a protecting jacket for the tube having a generator connection to equalize the pressure upon the inside and outside of the indicating tube.

13. A water level indicator for steam generators comprising a transparent indicating tube, means for connecting the ends of the tube to the generator above and below the normal water line, and a casing filled with a liquid surrounding the tube, with the contained liquid under a pressure approximately equal to the pressure in the generator.

14. A water level indicator for steam generators comprising a transparent indicating tube, means for connecting the ends of the tube to a generator, above and below the normal water line, and a casing surrounding the tube and filled with a liquid under a pressure approximately equal to that within the indicating tube.

15. A water level indicator for steam generators, comprising a casing having a transparent window portion, a transparent indicating tube extending through the casing and visible through the window portion, devices for connecting the ends of the tube to a generator above and below the normal water level, and a pipe connected to the lower part of the casing and extending to a height at least approximately equal to that of the chamber within the casing and then connectible to the generator below the normal water level, the space between the casing and tube being filled with a liquid and maintained filled by the said pipe.

16. A water level indicator for steam generators, comprising a casing having a transparent window portion, a transparent indicating tube extending through the casing and visible through the window portion, devices for connecting the ends of the tube to a generator above and below the normal water level, the space between the casing and tube being completely filled with a liquid, and means connected to the interior of the casing and the generator for maintaining an external compensating column of liquid to maintain the casing completely filled with the liquid during all variations of pressure and temperature.

17. A water level indicator for steam generators, comprising a casing having a transparent window portion, a transparent indicating tube extending through the casing and visible through the window portion, devices for connecting the ends of the tube to a generator above and below the normal water level, the space between the casing and tube being completely filled with a liquid, and a conduit connected to the interior of the casing, extending to a height at least equal to the highest part of the chamber within the casing and then descending for connection to the generator below the normal water level for maintaining the casing completely filled with the liquid during all variations of pressure and temperature.

18. A water level indicator for steam generators, comprising a casing having a transparent window portion, a transparent indicating tube extending through the casing and visible through the window portion, devices for connecting the ends of the tube to a generator above and below the normal water level, the space between the casing and tube being completely filled with a liquid, and a conduit connected between the lower part of the casing and the generator below the normal water level of the latter, the intermediate portion of the conduit rising to a height at least approximately equal to the highest part of the chamber within the casing.

19. A water level indicator for steam generators comprising a closed casing having a transparent window in one side wall thereof, a transparent tube extending between the end walls of said casing and visible through said window, means for connecting the ends of the tubes to a generator, and a U-shaped pipe connected at one end to the casing at a point intermediate of the length of the latter with the base of the U extending at least as high as the upper end of the chamber within the casing and with the other end of the U arranged for connection to the generator below the normal water level.

20. A water level indicator for steam generators comprising a transparent indicating tube, means for connecting the ends of the tube to a generator above and below the normal water level, a metal casing surrounding the tube and having secured behind an opening in a wall thereof a narrow relatively thick plate of window glass, and means including a conduit opening into the casing for connecting the interior of the casing to the generator to equalize the pressure on the inside and outside of the indicating tube.

In witness whereof, I hereunto subscribe my signature.

GEORGE ALFRED BRYAN.